United States Patent
Kuo et al.

(10) Patent No.: US 8,023,080 B2
(45) Date of Patent: Sep. 20, 2011

(54) HIGH TRANSMITTANCE BRIGHTNESS ENHANCED OPTICAL ELEMENT FOR LCD BY WHOLLY COATING PROCESS

(75) Inventors: Hui-Lung Kuo, Hsinchu (TW); Ping-Chen Chen, Hsinchu (TW); Yi-Ping Hsieh, Hsinchu (TW); Pao-Ju Hsieh, Hsinchu (TW); Yu-Hsun Wu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 12/498,355

(22) Filed: Jul. 6, 2009

(65) Prior Publication Data

US 2009/0284690 A1    Nov. 19, 2009

Related U.S. Application Data

(63) Continuation-in-part of application No. 10/909,318, filed on Aug. 3, 2004, now abandoned.

(51) Int. Cl.
*G02F 1/1335* (2006.01)

(52) U.S. Cl. ........................................ 349/115; 349/117

(58) Field of Classification Search ........................ None
See application file for complete search history.

(56) References Cited

U.S. PATENT DOCUMENTS

| | | | | |
|---|---|---|---|---|
| 4,841,057 A | * | 6/1989 | Miura et al. | 546/183 |
| 5,456,867 A | * | 10/1995 | Mazaki et al. | 264/2.6 |
| 2002/0167630 A1 | * | 11/2002 | Fujieda et al. | 349/117 |
| 2003/0147578 A1 | | 8/2003 | Pan et al. | |
| 2004/0105049 A1 | * | 6/2004 | Yeh et al. | 349/96 |
| 2004/0130672 A1 | | 7/2004 | Hsieh et al. | |
| 2004/0165140 A1 | * | 8/2004 | Pokorny et al. | 349/187 |
| 2005/0001955 A1 | * | 1/2005 | Yoon | 349/96 |
| 2006/0181662 A1 | * | 8/2006 | Kameyama et al. | 349/117 |

FOREIGN PATENT DOCUMENTS

CN    1388387 A1    1/2003

* cited by examiner

*Primary Examiner* — Lucy P Chien
(74) *Attorney, Agent, or Firm* — Huntington IP Consulting Co., Ltd; Chih Feng Yeh

(57) ABSTRACT

A high transmittance brightness enhanced optical element for backlight modules and liquid crystal display device is disclosed. The brightness enhanced polarizing optical element comprises a reflective polarizer film, a phase retardation film, and a polarization enhancement film. The reflective polarizer film provides a function of selectively reflecting right-handness circularly polarized light or left-handness circularly polarized light and will transmit the other one of them. The one was selectively reflected will be recombined with the light source or the backlight and re-direct toward the reflective polarizer. The portions of the reflective light will be recombined with the fresh light from the light source as above and the processes repeatedly. As a result, almost all of the light transmit the reflective polarizer and in the same circular polarization. The light is then transmitted the phase retardation film and converted to a polarized light with another optical axis.

15 Claims, 6 Drawing Sheets

HIGH TRANSMITTANCE BRIGHTNESS ENHANCED OPTICAL ELEMENT FOR LCD BY WHOLLY COATING PROCESS

CROSS-REFERENCE TO RELATED APPLICATION

The present application is a continuation-in-part application of U.S. patent application Ser. No. 10/909,318, filed Aug. 3, 2004. The above-listed application is commonly assigned with the present invention and the entire contents of which are incorporated herein by reference.

BACKGROUND OF INVENTION

1. Field of the Invention

The present invention generally relates to a highly brightness enhancing optical element for a backlight type LCD, and more particularly, to a highly brightness enhancing optical element integrated with a polarizer for a LCD with backlight sub-system supporting.

2. Description of the Prior Art

In all kinds of flat-panel displays, liquid crystal display (LCD) is the only one that employs linearly polarized light to produce brightness, darkness, and grey scale. A linearly polarized light is generated by passing light from backlight module through a polarizer. The linearly polarized light is then shooting into liquid crystal cell to produce brightness and darkness according to the arrangement of liquid crystal molecules in the cell.

However, the final output of the light is only 4-6% of that provided by backlight source. One of the major losses is from the dichroic polarizers of LCD that absorbs half of incident light. Therefore, if the incident light can be transformed to one of the linearly polarized light that is able to totally transmit the polarizer, the efficiency of the backlight system can be significantly improved and the brightness of the current LCD can thus be enhanced.

A reflective type polarizer has been developed as a brightness enhancement optical element for LCD, which does not absorb light itself. One of the reflective type polarizer is a cholesteric liquid crystal reflective type polarizer, which can turn an unpolarized white light into a circularly polarized lights, left-handness circularly polarized light or right-handness circularly polarized light. One of the circularly polarized lights will transmit the cholesteric liquid crystal film, while the other will be reflected. The circularly polarized light originally reflected by the cholesteric liquid crystal film can be easily converted to a transmissible circularly polarized light by using a simple surface of reflective character. The backlight module of a LCD usually contains such a reflective mechanism. The transmissible circularly polarized light will pass through the cholesteric liquid crystal film. This means all the light from backlight system will, in theoretically, all pass the polarizer and thus generates right or left-handness circularly polarized light with double light intensity. The incident unpolarized white light from the backlight module can be converted to a linearly polarized light with double light intensity. According to optics fact, if a quarter-wave plate is attached to the cholesteric liquid crystal film. Such a brightness enhancement optical element can be seen in U.S. Pat. No. 5,506,704, for example.

U.S. Pat. No. 5,506,704 discloses a reflective polarizer made by assembling a quarter-wave plate and a polarizer to a cholesteric liquid crystal, wherein the quarter-wave plate is formed by solvent casting or extruding and then being precisely stretched. To assembly the reflective polarizer, the quarter-wave plate needs to be coated with an optical paste to make sure that the quarter-wave plate is successfully adhered to the cholesteric liquid crystal. To assure integrity of the quarter-wave plate before it is employed, it is covered with a protective film. Accordingly, the protective film needs to be stripped before proceeding with the adhering step, thereby not only wasting additional material and increasing complexity of manufacturing but increasing the number of interfaces between several layers, which results in optical transmission loss. The polarizer is generally made by a more complex extension process, which has an upper and a bottom TAC film and an optical paste layer. As a result, the polarizer has more interfaces and is thicker in comparison with the quarter-wave plate, which increases the cost of manufacturing and cause a reduction in transmittance, and thus adversely affects the performance of the optical element.

U.S. Pat. Nos. 5,601,884 and 5,743,980 disclose a method of preparing a phase delay plate by coating on a glass substrate with a birefringent liquid crystal. U.S. Pat. No. 6,262,788 B1 discloses a method of preparing a phase delay plate by coating a liquid crystal on TAC film. The objectives of the aforesaid US patents are not directed to an optical conversion for segregated lights from the cholesteric liquid crystal film. In regard to the fabrication of a polarizer, U.S. Pat. No. 6,049,428 discloses a novel E-type polarizer having a transmitting axis parallel to the molecular optical axis, which is different from the conventional O-type polarizer having a transmitting axis perpendicular to the molecular optical axis. However the E-type polarizer is basically a light absorption type polarizer, and doesn't have mechanisms for converting a light polarized state and recovering light to enhance brightness.

As to the preparation of the polarizer, conventionally, the polarizer is prepared by stretching the PVA (polyvinyl alcohol) film in iodinate containing Solution so as to grow microcrystalline and is then covered with a TAC (Triacetate Cellulose) film. However, the iodinate is a poison material and the PVA stretching processes to grown crystalline are rather complicated and lousy. Apart from that, the stretched PVA type polarizer is found to absorb more than 50% of light. As a result, the transmittance is 38-44% only in reality. Thus the conventional polarizer is a high energy consumption product.

SUMMARY OF THE INVENTION

The present invention is to provide a method of forming a brightness enhanced polarizer by wholly coating process. The brightness enhanced polarizer is basically contains from a bottom thereof (1) a reflective polarizer film, (2) a phase retardation film, and (3) a polarization enhancement layer. The reflective polarizer film is formed of cholesteric liquid crystal. The reflective polarizer film, provide functions of reflecting one of the polarized light and transmitting the other polarized light, respectively. For example, the left-handness circular polarized light can pass the film and the right-handness circular polarized light is reflected by the reflective polarizer film. A phase retardation film and a polarization enhancement layer are formed over the reflective polarizer film. The phase retardation layer provides function of converting the polarization state of light, e.g. convert a polarized light of circular polarized state into a linear polarized state. In this invention, the phase retardation film is more characterized by providing function of adjusting the axis of the linear polarized light to nearly or the same as the direction of the transmittance axis of the polarization enhancement layer. So that, most of the light provided by back light module will finally convert into linear polarized light and also the right direction to pass the polarizer assembly. By this invention, it is feasible to provide a directly roll-to-roll method to coat the polarization enhancement layer on the top of the phase retardation layer without adjusting its optical axis. This roll-to-roll method provide more convenient and cost-efficient way to build such a target product of this invention. The polarization enhancement layer provides a function of adjusting the polarizability of polarized light. The polarization enhancement layer contains an uppermost transmitting axis and a lowermost transmitting optical axis. It is usually perpendicular to each other but on the same plane. The direction of uppermost transmitting optical axis is essentially the same as the optical axis of the target product of this invention. The foresaid three films can be formed by directed contact or using optical adhesive glue to adhere them together.

The phase retardation film is formed of liquid crystal and has a top surface and a bottom surface. The directors of the liquid crystal molecules therein are twisted an angle from the bottom surface to the top surface. The twisted direction is different from that of the reflective polarizer film of cholesteric liquid crystal type. That is if the cholesteric liquid crystal type of the reflective polarizer film is a right-handness helix structure, the phase retardation film must be a left-handness twisted structure. On the contrary, if the cholesteric liquid crystal type of reflective polarizer film is a left-handness helix structure the phase retardation film must be a right-handness twisted structure. In addition, the polar angle of the director of LC molecules of the phase retardation film can be adjusted so as to increase the refractivity in the Z axis direction where the plane of the phase retardation film is assumed disposed on the X-Y plane and the polar angle is the angle between the director of the LC molecule and the surface normal (Z axis).

The present invention provides a high efficiency polarized light source and a backlight module. The backlight module is composed of a brightness enhanced polarizer, a light source, and reflective member. The reflective polarizer film of the brightness enhanced polarizer is to split the light from the backlight module into The present invention provides a high optical efficient display device at least having brightness enhanced polarizer, backlight module, and a liquid crystal display panel. The liquid crystal display panel is composed of a top polarizer, top substrate, liquid crystal, a transparent substrate formed with thin film transistors and a lower polarizer which is optional. The top polarizer has an optical transmitting axis in consistence with a predetermined optical axis of said liquid crystal panel.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
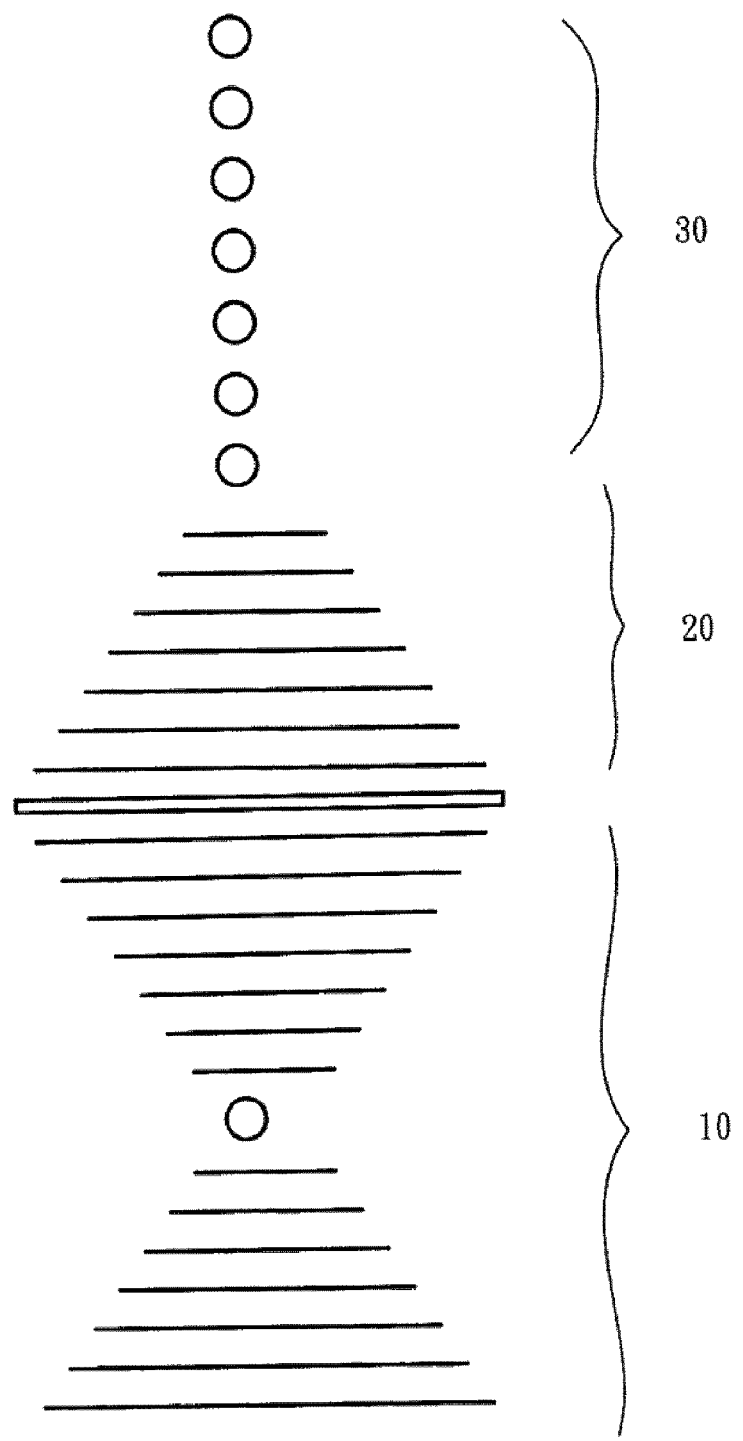
FIG. 1 shows a cross-sectional of the brightness enhanced polarizing optical element.

The present invention discloses a brightness enhanced polarizing optical element for a backlight type LCD. The brightness enhanced polarizing optical element comprises a structure from a bottom substrate thereof a reflective polarizer 10, a phase retardation film 20, and a polarization enhancement film 30 as is shown in FIG. 1. In FIG. 1, the light from a light source transmitting the brightness enhanced polarizing optical element is splitting in reflective polarizer film 10 to either a right-handness helix polarized light or a left-handness helix polarized light which will transmit the reflective polarizer film, and a reflective light, which will be recombined with the light source or the backlight and then are guided toward the reflective polarizer and the light splitting again. The portions of the reflective light will be recombined with said light source as above and the processes repeatedly. As a result, almost all of the light will transmit the reflective polarizer and in the same polarized-light. The light is then transmitted the phase retardation film 20 and converted to a polarized-light with another optical axis. Finally the polarized-light is adjusted to the same polarizing axis to transmit the polarizing axis.

The coating is performed with an extruding die or a coating caster directly on a single transparent substrate of an optical grade such as TAC or PC (Polyacrylate).

At the beginning of the coating process the optical axes of the films should be determined in advance, for example, the optical axis of the molecular helix of cholesteric liquid crystal film is parallel to the normal of the film surface. In other words, the molecular directors from an upper layer to a bottom layer of the cholesteric liquid crystal film are parallel to the substrate, and the molecules between the upper layer and the lower layer are in a helix configuration so that the cholesteric liquid crystal film can circularly polarize the incident unpolarized light into a circular polarized light. The cholesteric liquid crystal film may be formed of a single layer or layers assembly of cholesteric liquid crystal polymer material. To achieve brightness enhancement effect in the whole range of the visible light, the cholesteric liquid crystal film of the present invention needs to have different pitches with a continuous or discontinuous variation from a minimum to a maximum or from a maximum to a minimum.

Embodiment 1

Optical Simulation for Parameters of the Phase Retardation Film

Figure 2:
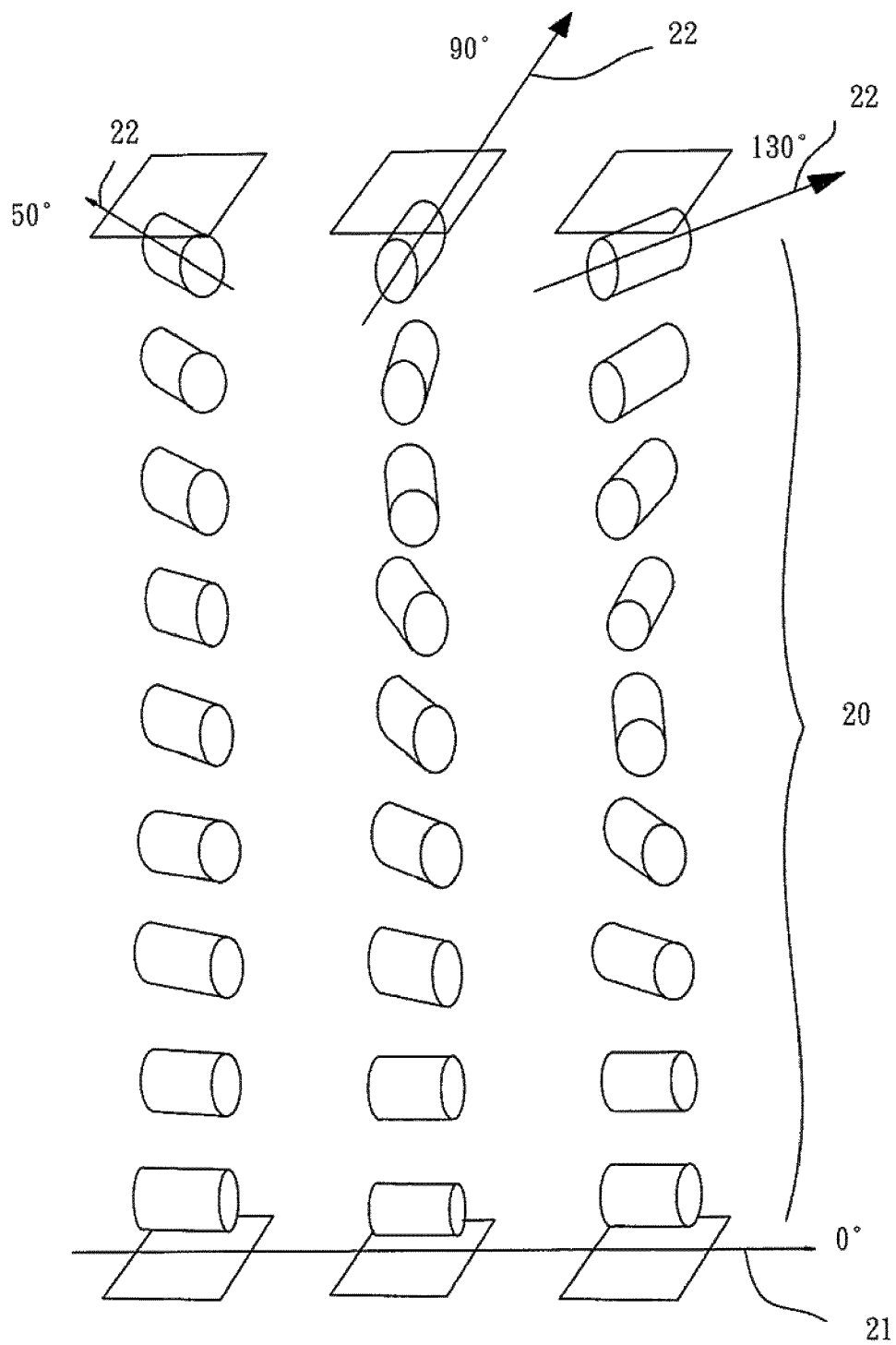
FIG. 2 shows twisting state of molecules of phase retardation film.

The phase retardation films formed of liquid crystal with index of refraction of about: ne=1.6454, no=1.4992, $\Delta n$=0.1462 at wavelength $\lambda$=600 nm are prepared. The thicknesses of films are various from 1.0 μm to 3.5 μm. Referring to FIG. 2, the twist angles of directors of molecules of the liquid crystal are varied from a bottom surface to the top surface of the film to be calculated in a range of about 50° to 130°. The angle is defined between a director 21 of the bottom surface of the thin film and a director 22 of the liquid crystal on the upper surface. The director of the bottom surface is defined as 0°.

The linear retardation values in unit of nanometer (nm) are calculated by a simulation program called Axiometrics optical simulation software. The results are shown in table 1, as follows:

TABLE 1

| Twist angle(°) | Thickness(μm) | | | | | |
|---|---|---|---|---|---|---|
| | 1.0 | 1.5 | 2.0 | 2.5 | 3.0 | 3.5 |
| 50 | 121.70 | 172.27 | 206.92 | 174.44 | 94.28 | 15.34 |
| 70 | 101.73 | 137.79 | 153.96 | 140.28 | 72.95 | 10.60 |
| 90 | 79.20 | 101.95 | 104.77 | 81.95 | 29.66 | 50.12 |
| 110 | 56.01 | 67.59 | 61.51 | 34.97 | 12.80 | 80.14 |
| 130 | 33.65 | 36.16 | 24.22 | 3.50 | 46.73 | 104.10 |

Figure 3:
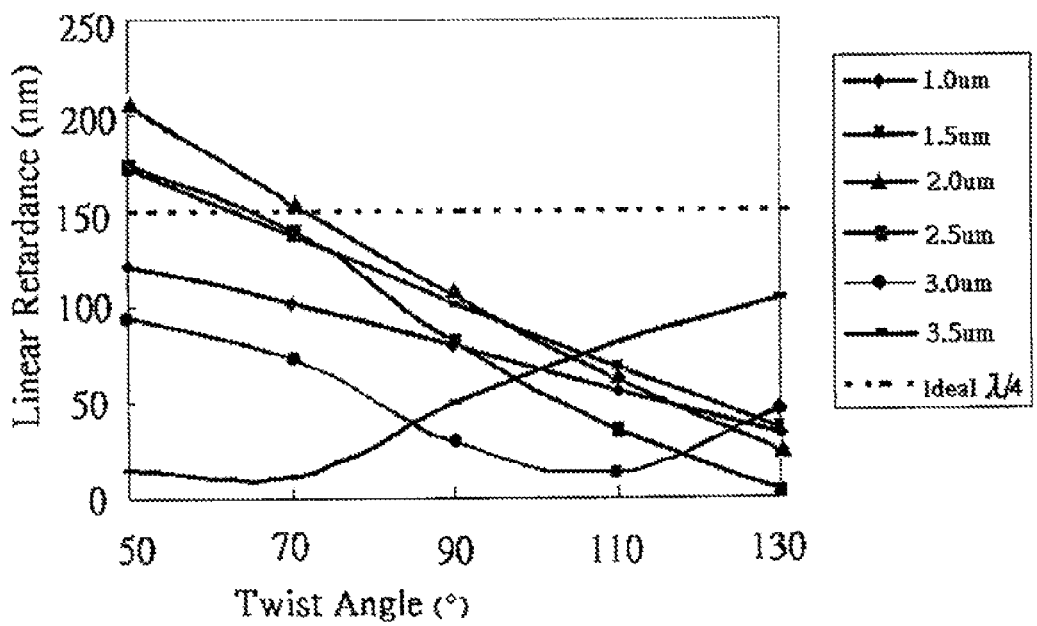
FIG. 3 shows the linear retardation values for thickness versus twist angle.

To see the tendency, the linear retardation values for thickness versus twist angle are also be illustrated by graphic, as is shown in FIG. 3. In FIG. 3, smaller twist angle and thinner of the films are, the higher liner retardation values will be except the film with thickness 3.5 μm, which shown a reversal result.

Embodiment 2

Prepared an Nematic Phase Retardation Film in Accordance with the FIG. 1 so as to Find Out Optimum Conditions During Preparation Polymerized nematic liquid crystal BASF Palicolor LC-242 (2.9946 g) mixed with right-handness chiral compound LC-756 (0.0054 g) are dissolved in a solvent (7 g), which is composed of toluene and cyclohexanone in a proportion of 4:1 and then coated on a orientation-treated substrate by spin coating and then curing by irradiated under UV (ultraviolet) lamp with 100 W/cm$^2$ for predetermined time period. Table 2 shows relations of spin speed (rpm) of spin coating, thickness, twist angle, and retardation value (in nm at an optical wavelength 600 nm (hereinafter denoted as @600 nm). The resulted phase retardation values of the phase retardation film are measured by Axiometrics.

TABLE 2

| spin speed (rpm) | Thickness (um) | angle (°) | phase retardation value (nm, @600 nm) |
|---|---|---|---|
| 1100 | 1.963 | 90.02 | 126.7 |
| 1300 | 1.794 | 81.54 | 141.8 |
| 1800 | 1.531 | 70.00 | 150.1 |

Embodiment 3

The Preparation Conditions are in Accordance with Embodiment 2 but the Material is for Reflective Polarizer Film, and then Coated Thereon with a Polarization Enhancement Layer Left-Handness Helix Reflective Polarizer 1:

Polymerized nematic LC1057 (2.65 g) mixed with left-handness chiral compound LC-1080 (0.35 g) are dissolved in an solvent (7 g), which is composed of toluene solvent (7 g), which is composed of toluene and cyclohexanone in a proportion of 4:1 and then coated on a orientation-treated substrate by spin coating and then cured by irradiated under UV (ultraviolet) lamp with 100 W/cm$^2$. The reflective polarizer film has a wavelength center of about 620 nm.

Right-Handness Helix Structure Polarizer 2:

Polymerized nematic LC1057 (2.65 g) mixed with right-handness chiral compound LC-756 (0.15 g) are dissolved in an solvent (7 g), which is composed of toluene solvent (7 g), which is composed of toluene and cyclohexanone in a proportion of 4:1 and then coated on a orientation-treated substrate by spin coating and then cured by irradiated under UV (ultraviolet) lamp with 100 W/cm$^2$. The right-handness helix structure reflective polarizer film has a wavelength center of about 600 nm.

Polarization Enhancement Layer

Polymerized nematic SLM90519 (2.88 g) mixed with dichroic dye AB4 and AZO in a proportion of 3:2 (0.12 g) are dissolved in an solvent (7 g), which is composed of toluene solvent (7 g), which is composed of toluene and cyclohexanone in a proportion of 4:1 and then coated on a orientation-treated substrate by spin coating and then cured by irradiated under UV (ultraviolet) lamp with 100 W/cm$^2$. The polarization enhancement layer has a wavelength range between about 450-650 nm.

The reflective polarizer film is coated thereon with the foresaid nematic phase retardation film and the polarization enhancement layer successively. The resulted films are the demanded brightness enhanced optical element.

When the left-handness helix reflective polarizer film prepared as embodiment 3 and using a spin speed of 1100 rpm, the result films is the brightness enhanced optical element by the wholly coating processes called an embodiment 4-11. When the left-handness helix reflective polarizer film prepared as embodiment 3 and using a spin rate 1800 rpm, the result films are the brightness enhanced optical element by the wholly coating processes called an embodiment 4-2. If the left-handness helix reflective polarizer film is replaced with right-handness helix reflective polarizer film, in embodiment 4-1, the resulted brightness enhanced optical element is called embodiment 4-3. If the left-handness helix reflective polarizer film is replaced with right-handness helix reflective polarizer film, in embodiment 4-2, the resulted brightness enhanced optical element is called embodiment 4-4.

Control Example

Control example 1 is a left-handness helix reflective polarizer film 1 coated therover with a pure nematic liquid crystal QWF without any chiral dopant, and the QWF has Ro value nearly the same to foresaid embodiment (Ro is the phase retardation value on the film) and coated the same polarization enhancement layer as in embodiment 2.

Control example 2 is a right-handness helix reflective polarizer film 1 coated thereover with a pure nematic liquid crystal QWF without any chiral dopant, and the QWF has almost the same Ro value as in embodiment 2 (Ro is the phase retardation value on the film) and coated the same polarization enhancement layer as in embodiment 2.

Polymerized nematic liquid crystal BASF Palicolor LC-242 (3.0 g) dissolved in an solvent (7 g), which is composed of solvent (7 g) of toluene and cyclohexanone in a proportion of 4:1 and then coating on a orientation-treated substrate by spin coating and then curing irradiated by an UV lamp. The resulted coating film is a phase retardation film. And then the phase retardation film is measured by Axiometics MMSP-BIS. When the rotation rate of spin coating is 1000 rpm, the phase retardation is measured to be 155 nm at a wavelength 600 nm.

Figure 4A:
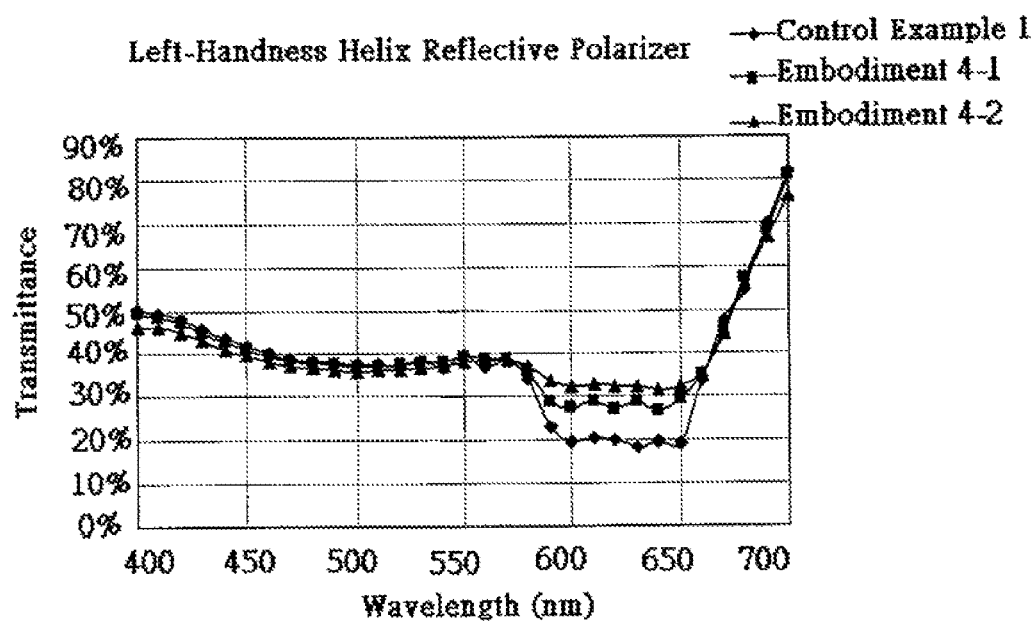
FIG. 4A shows transmittance of the brightness enhanced polarizer of the control example 1 compared with that of the embodiments 4-1 and 4-2.

Referring to FIG. 4A, the transmittance of the brightness enhanced polarizer of the control example 1 is compared to that of the embodiments 4-1 and 4-2. The control example 1 has a phase retardation film without chiral dopant but the embodiments 4-1 and 4-2 have the reflective polarizer films formed of cholesteric liquid crystal have a different handness of helix direction from the phase retardation film. The results show that the transmittance of the embodiments 4-1 and 4-2 is at least 50% higher than control example 1.

Figure 4B:
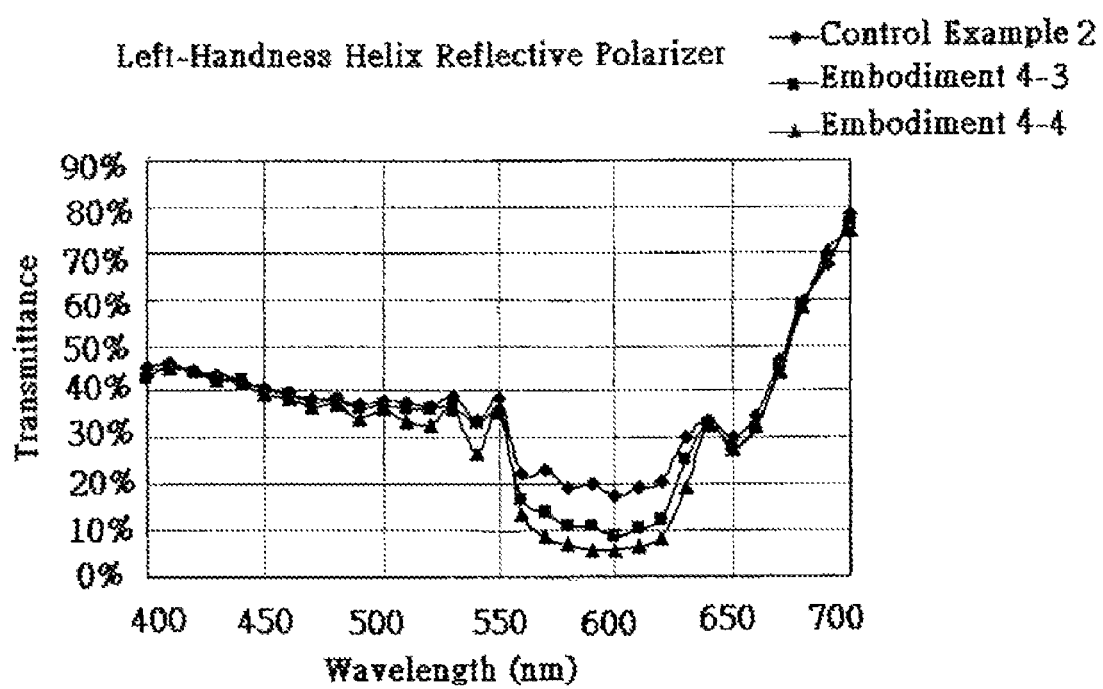
FIG. 4B shows transmittance of the brightness enhanced polarizer of the control example 1 compared with that of the embodiments 4-3 and 4-4.

Whereas, as shown in FIG. 4B, the transmittance of the control example 1 is at least 50% higher than transmittance of the embodiments 4-3 and 4-4. The reflective polarizer films formed of cholesteric liquid crystal in embodiments 4-3 and 4-4 have the same helix handness as the twisted handness in phase retardation film. Thus, when we sort the transmittance of the possible assembly of the films, it is found that the embodiment 4-1 and embodiment 4-2>the control example 1>the embodiment 4-3 and embodiment 4-2. Obviously, no matter what the twisted angles of the liquid crystal molecules in the phase retardation film are, the helix in the reflective polarizer film and the twist direction of the phase retardation film is the same or reversed handness will be a important key factor, which makes big difference between the brightness enhanced polarizing optical element according to the present disclosure and the related technology. The twisted handness of the phase retardation film determines the brightness enhanced polarizing optical element is work or not function at all.

Table 4 shows a comparison table of brightness (cd/m$^2$) and brightness enhancement for above embodiments and control examples.

|  | Polarization enhancement layer | Control example 1 | Em 4-1 | Em 4-2 | Control example 2 | Em 4-3 | Em 4-4 |
| --- | --- | --- | --- | --- | --- | --- | --- |
| brightness (cd/m$^2$) | 468 | 489 | 534 | 542 | 486 | 421 | 373 |
| brightness enhancement | 1 |  | 1.04 | 1.14 | 1.16 | 1.04 | 0.90 | 0.80 |

Brightness of backlight 1065 cd/m$^3$

Figure 5A:
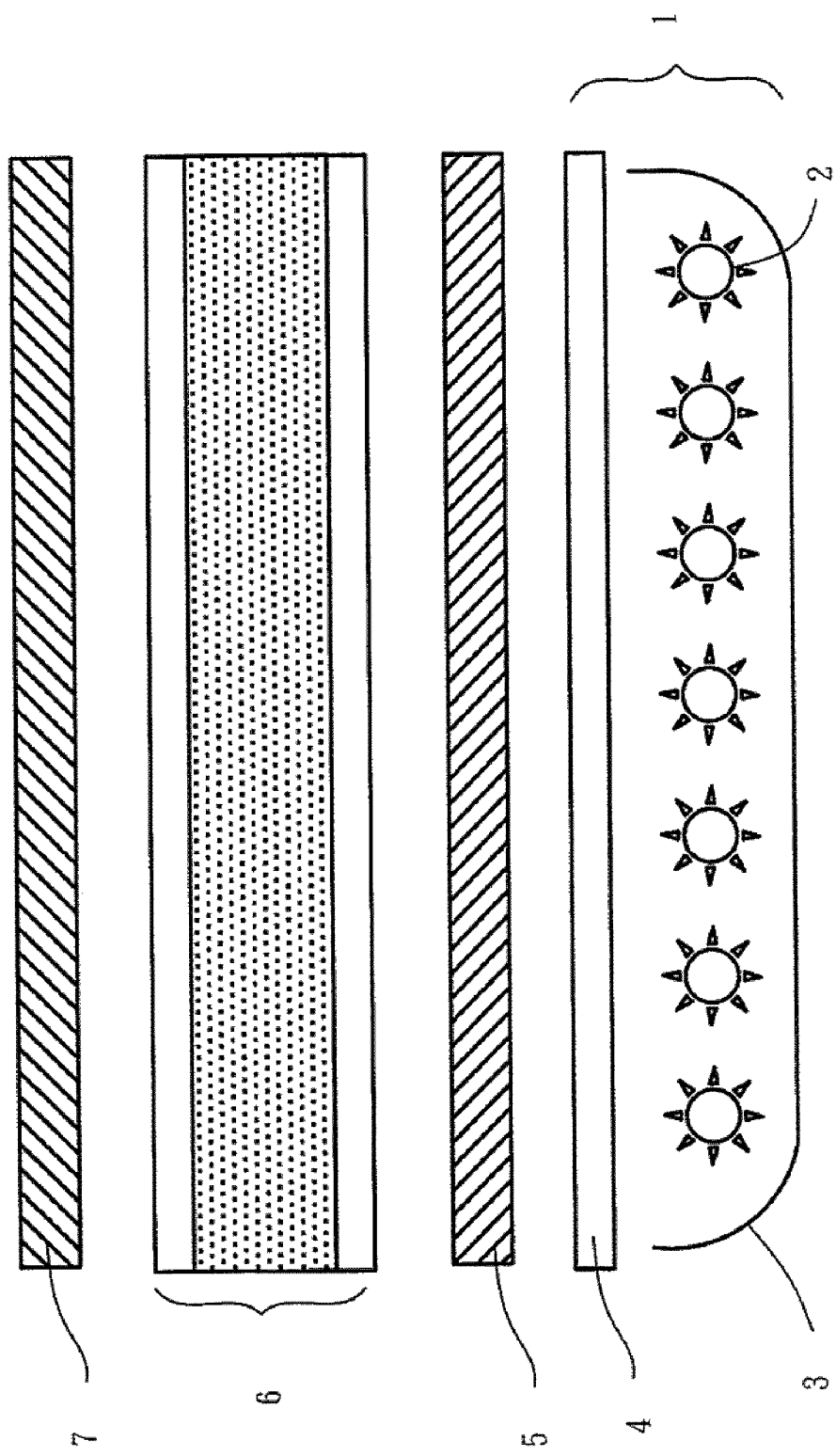
FIG. 5A illustrates a cross-sectional view of a high efficiency liquid crystal display device with backlight module of direct light source type.
Figure 5B:
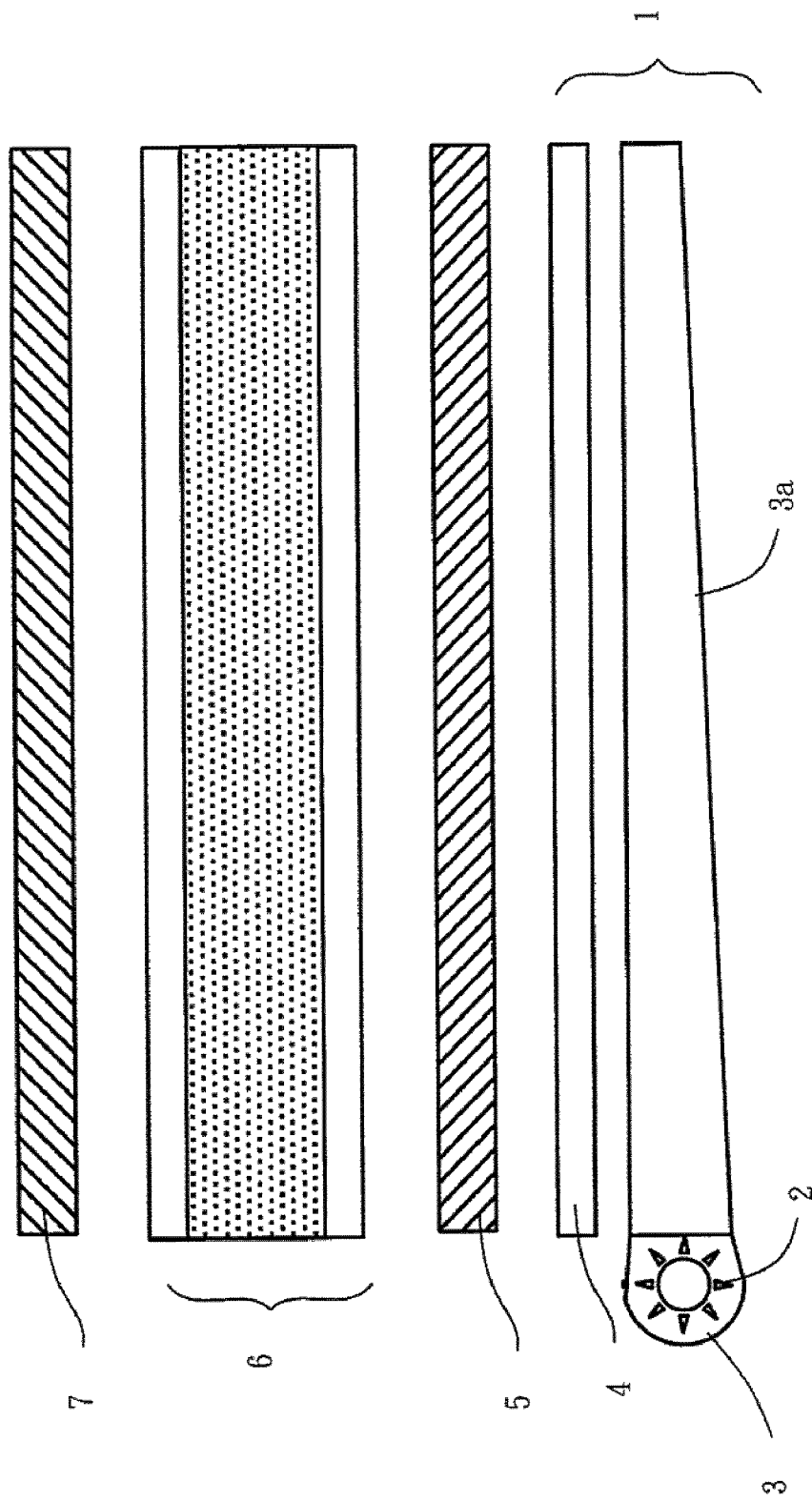
FIG. 5B illustrates a cross-sectional view of a high efficiency liquid crystal display device with a backlight module of side light source type.

FIG. 5A illustrates a schematic diagram of high efficiency liquid crystal display device with a direct light source 2 from a backlight module 1. The structure comprises the lamp 2, reflective lamp shade 3, diffused plate 4, brightness enhanced polarizing optical element 5, liquid crystal cell 6, and a top polarizer 7. FIG. 5B illustrates a schematic diagram of high efficiency liquid crystal display device with a side light source 2 from a backlight module 1. The structure comprises lamp 2, light guide plate 3a, diffused plate 4, the brightness enhanced polarizing optical element 5, liquid crystal cell 6, and a top polarizer 7.

In one preferred embodiment of the present disclosure, the brightness enhanced polarizing optical element applied in a liquid crystal display device is formed by using wholly coating process. In which, the liquid crystal display device includes a light source, a backlight module, and a liquid crystal panel, and the liquid crystal panel in a viewer side having a top polarizer, substrate, liquid crystal, a transparent substrate formed with thin film transistors and the top polarizer has an optical transmitting axis in consistence with a predetermined optical axis of the liquid crystal panel.

The advantages and key features distinguish the present invention from related technology are as follows:

1. As depicted above, the twisted angle of the molecule in the phase retardation film differs from that of the reflective polarizer film of cholesteric liquid crystal, and it will dramatically increase the transmittance of the liquid crystal display device, thus it is a key factor for improving transmittance. In U.S. Pat. No. 7,187,424, although it discloses a quarter wave plate formed of molecules having a director only, it dose not disclose the fact mentioned above. In other words, in U.S. Pat. No. 7,187,424, although it discloses a quarter wave plate, which includes a film with molecule alignment twisted, it does not disclose the key point as mentioned above, and this makes the present disclosure get a better transmittance than the related arts, such as U.S. Pat. No. 7,187,424.

2. Since, according to the present disclosure, one of the preferred embodiments utilizes directly wholly coating process to form polarization enhancement film, which can not be founded in related art such as U.S. Pat. No. 7,187,424. The wholly coating process in the present invention disclosure enables the top-surface of the first coating layer (in the present invention, it is a reflective polarizer film of cholesteric liquid crystal) acting as an alignment layer for coating the phase retardation film layer on it. In addition, the top-surface of the phase retardation film also acts as an alignment layer for coating the polarization enhancement layer on it. In other words, through the directly wholly coating process, the surface of the first coating layer, the reflective polarizer film of cholesteric liquid crystal, is an alignment layer of the phase retardation film and the surface of the phase retardation film thereon is also an alignment layer of die polarization enhancement layer. Thus, according to the preferred embodiments of the prevent disclosure, the wholly coating process, the concept of self alignment for next layer is not shown in the previous art, makes the present disclosure possessed advantages over the prior art.

As is understood by a person skilled in the art, the foregoing preferred embodiment of the present invention is an illustration of the present invention rather than limiting thereon. It is intended to cover various modifications and similar arrangements included within the spirit and scope of the appended claims, the scope of which should be accorded the broadest interpretation so as to encompass all such modifications and similar structure.

What is claimed is:

1. A brightness enhanced polarizing optical element, comprising:
   a reflective polarizer film;
   a phase retardation film formed of liquid crystal directly on said reflective polarizer film, said phase retardation film having a top surface and a bottom surface and the directors of LC molecules inside the phase retardation film are twisted an angle layer by layer, from the one surface to the other surface and its twist handness is reversely to the helix handness of said reflective polarizer film; and
   a polarization enhancement film formed directly on said phase retardation film and said polarization enhancement film having a uppermost optical transmitting axis and a lowermost optical transmitting axis and said uppermost optical transmitting axis being significantly the same as optical axis of said brightness enhanced polarizing optical element, wherein said uppermost transmitting optical axis and said lowermost optical transmitting axis has a ratio of transmittance at least larger than 5.

2. The brightness enhanced polarizing optical element according to claim 1, wherein said reflective polarizer film is formed of cholesteric liquid crystal whose axis of molecular helix is normal to the surface of said reflective polarizer film.

3. The brightness enhanced polarizing optical element according to claim 1, wherein said reflective polarizer film is formed of cholesteric liquid crystal whose axis of molecular helix is normal to a surface of said reflective polarizer film and its molecular helix is left-handness.

4. The brightness enhanced polarizing optical element according to claim 1, wherein said reflective polarizer film is formed of cholesteric liquid crystal whose optical axis of molecular helix is normal to a surface of said reflective polarizer film and its molecular helix is right-handness.

5. The brightness enhanced polarizing optical element according to claim 1, wherein molecules of said phase retardation film having a twist angle except 0°.

6. The brightness enhanced polarizing optical element according to claim 1, wherein molecules of said phase retardation film having a twist angle smaller than 180° except 0°.

7. The brightness enhanced polarizing optical element according to claim 1, wherein molecules of said phase retardation film having a twist angle between about 70-110°.

8. The brightness enhanced polarizing optical element according to claim 1, wherein said phase retardation film provides a retardation values between about 1/8 to 1/3 of wavelength.

9. The brightness enhanced polarizing optical element according to claim 1, wherein transmittance difference between said uppermost transmitting optical axis and said lowermost optical transmitting axis of polarization enhancement film is due to dichroic dye.

10. The brightness enhanced polarizing optical element according to claim 9, wherein transmittance difference between said uppermost transmitting optical axis and said lowermost optical transmitting axis of said polarization enhancement film is due to dichroic dye and liquid crystal.

11. The brightness enhanced polarizing optical element according to claim 9, wherein said polarization enhancement film is formed of dichroic dye and liquid crystal in which said dichroic dye is between about 0.5 to 10 wt %.

12. The brightness enhanced polarizing optical element according to claim 9, wherein said polarization enhancement film is formed of dichroic dye and liquid crystal in which said dichroic dye is between about 1 to 5 wt %.

13. The brightness enhanced polarizing optical element according to claim 1, wherein said reflective polarizer film is formed by deposed cholesteric liquid crystal film on an orientation-treated substrate.

14. The brightness enhanced polarizing optical element according to claim 1, wherein interfaces among said reflective polarizer film, phase retardation film, and said polarization enhancement film are provided as a director of a successively formed layer.

15. A brightness enhanced polarizing optical element, comprising:
   a reflective polarizer film;
   a phase retardation film formed of liquid crystal directly on said reflective polarizer film, said phase retardation film having a top surface and a bottom surface and the directors of LC molecules inside the phase retardation film are twisted an angle layer by layer, from the one surface to the other surface and its twist handness is reversely to the helix handness of said reflective polarizer film; and
   a polarization enhancement film formed directly on said phase retardation film and said polarization enhancement film having a uppermost optical transmitting axis and a lowermost optical transmitting axis and said uppermost optical transmitting axis being significantly the same as optical axis of said brightness enhanced polarizing optical element, wherein said uppermost transmitting optical axis and said lowermost optical transmitting axis has a ratio of transmittance at least larger than 20.

* * * * *